Feb. 25, 1969 T. C. J. L. STAAR 3,429,519
TAPE CARTRIDGE POSITIONING AND DRIVING APPARATUS
Filed Oct. 12, 1966
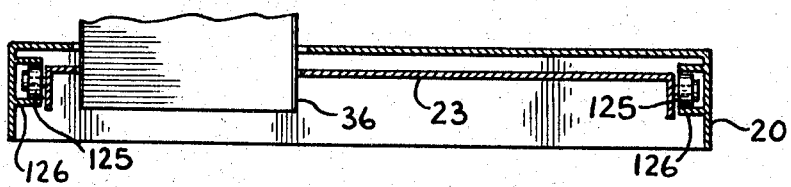
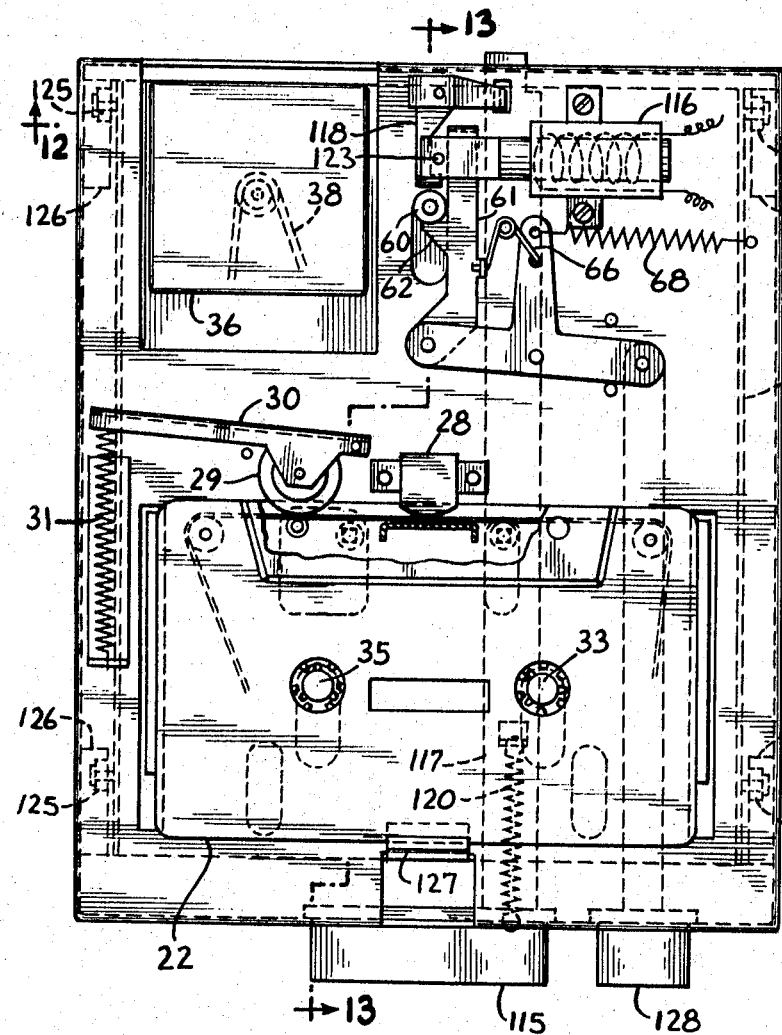
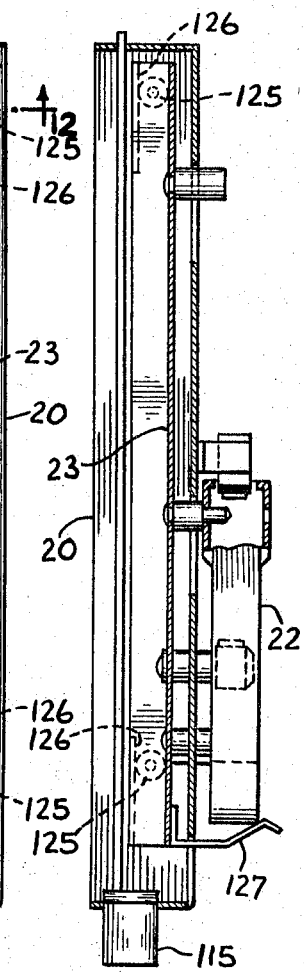
INVENTOR
THEOPHIEL CLEMENT JOZEF LODEWIJK STAAR
by: Wolfe, Hubbard, Voit & Osann
ATTYS.

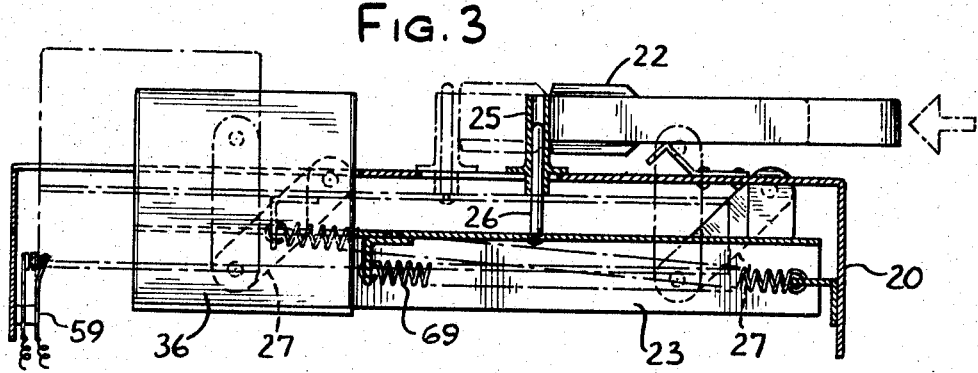
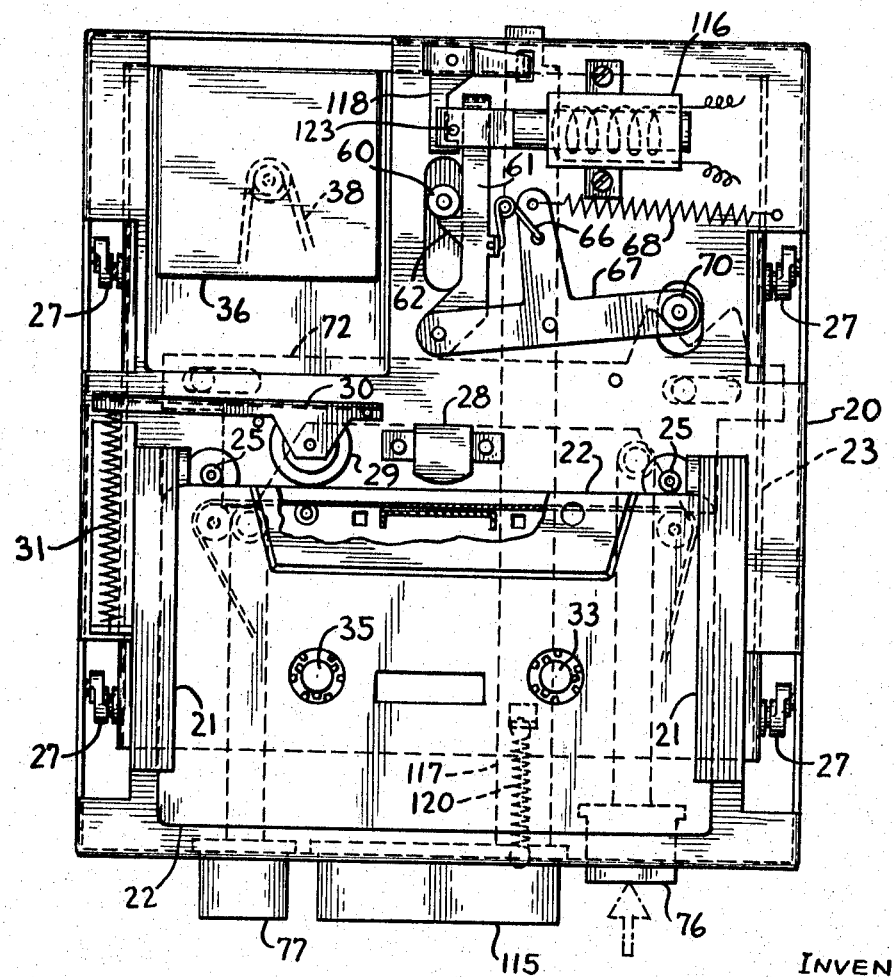

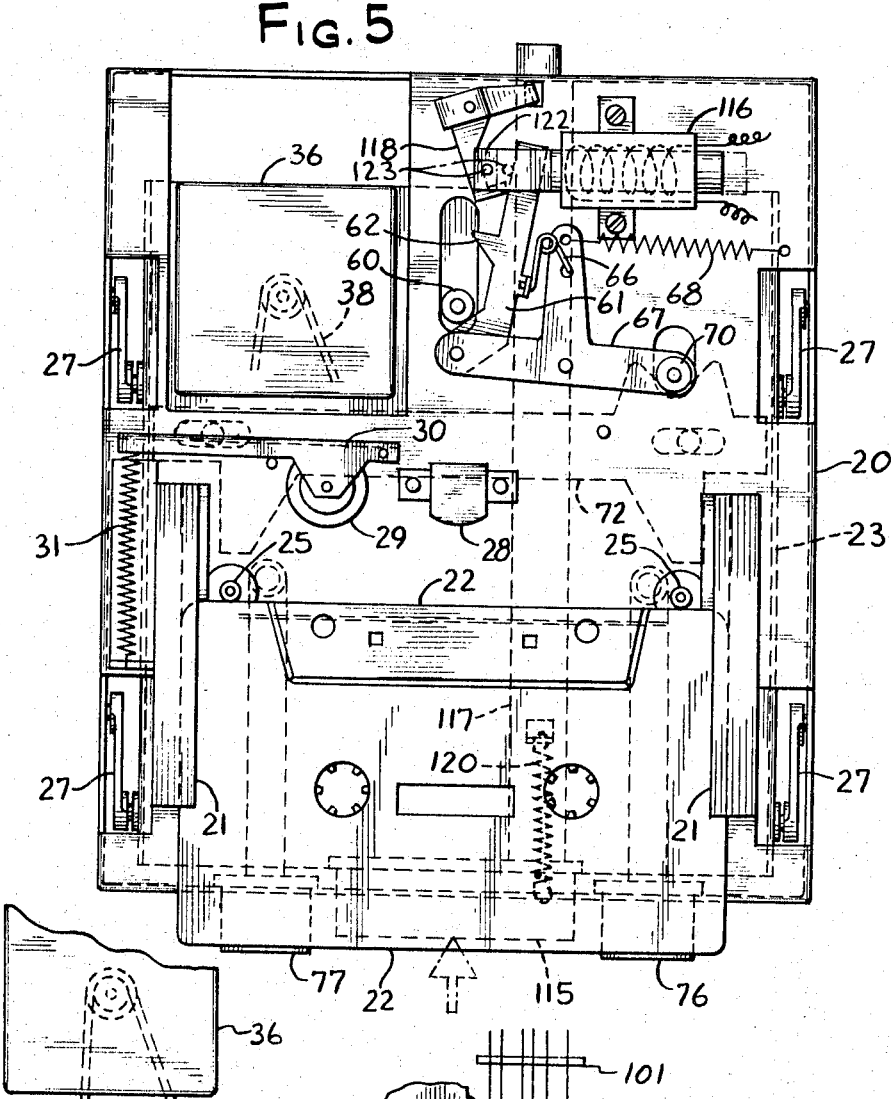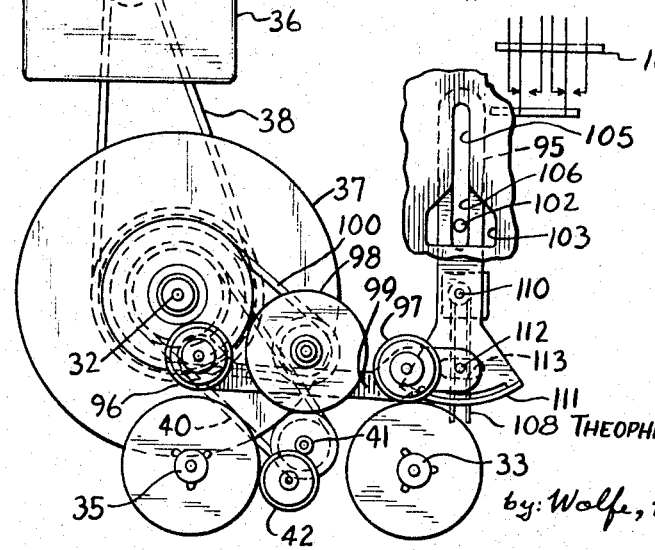

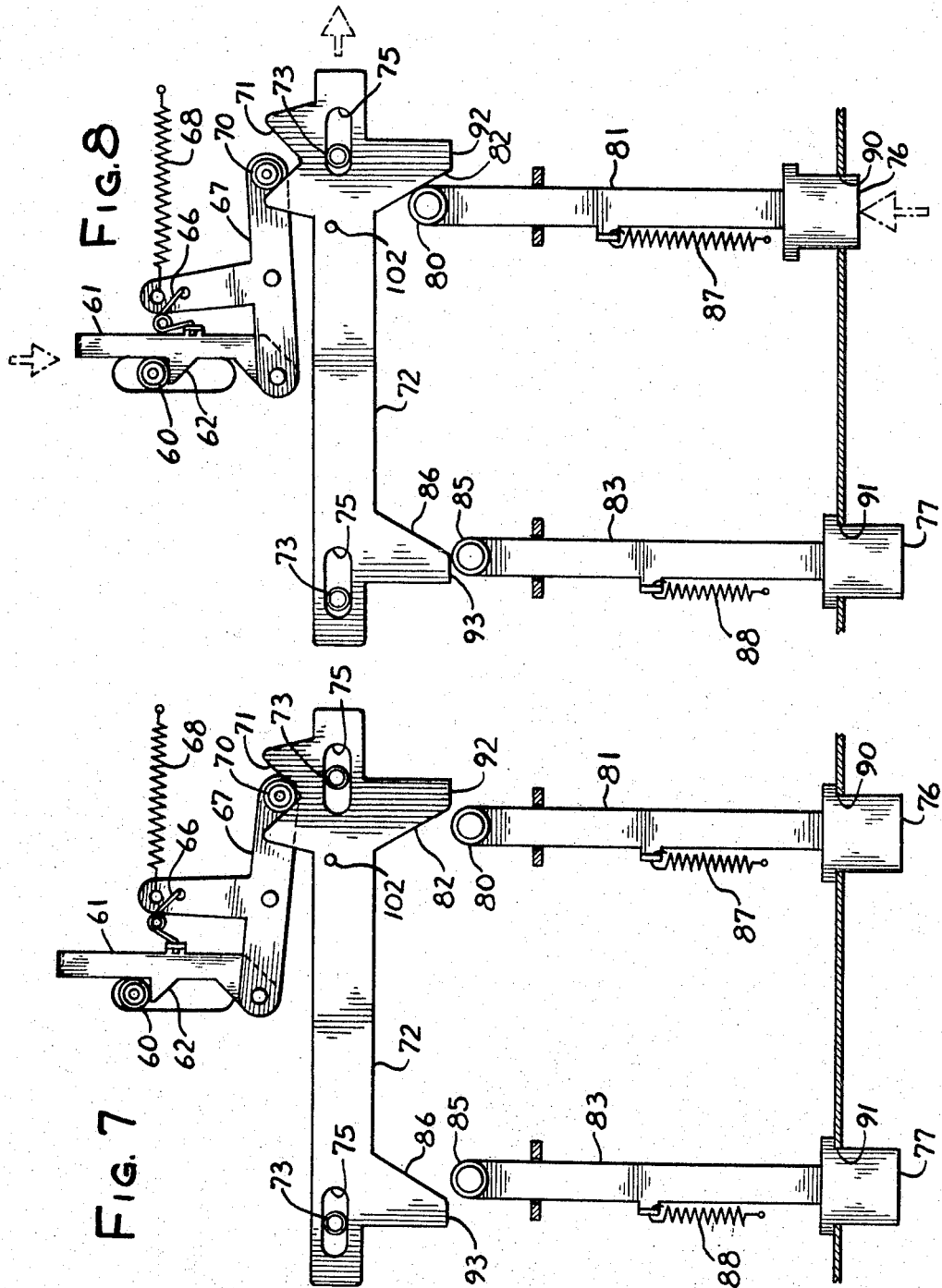

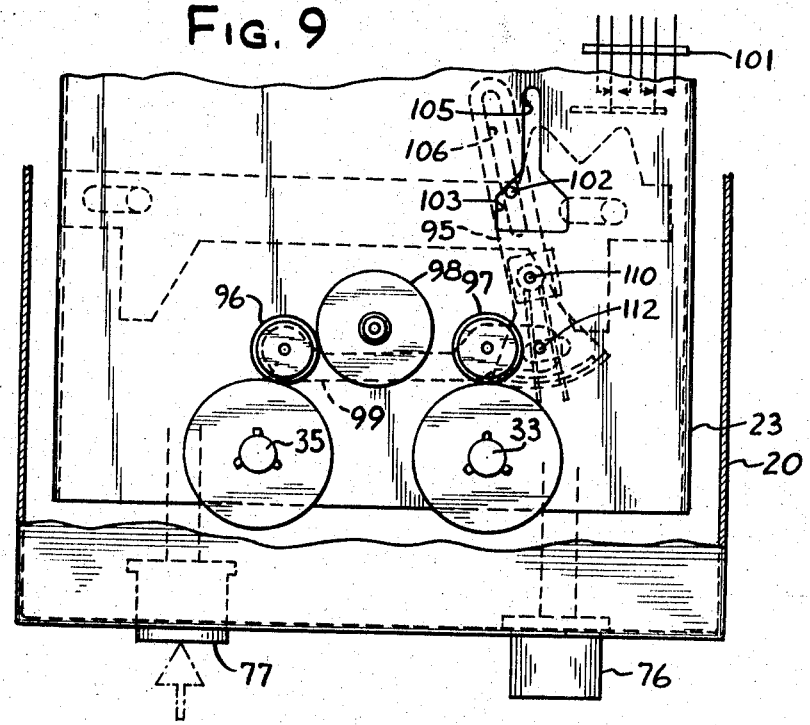
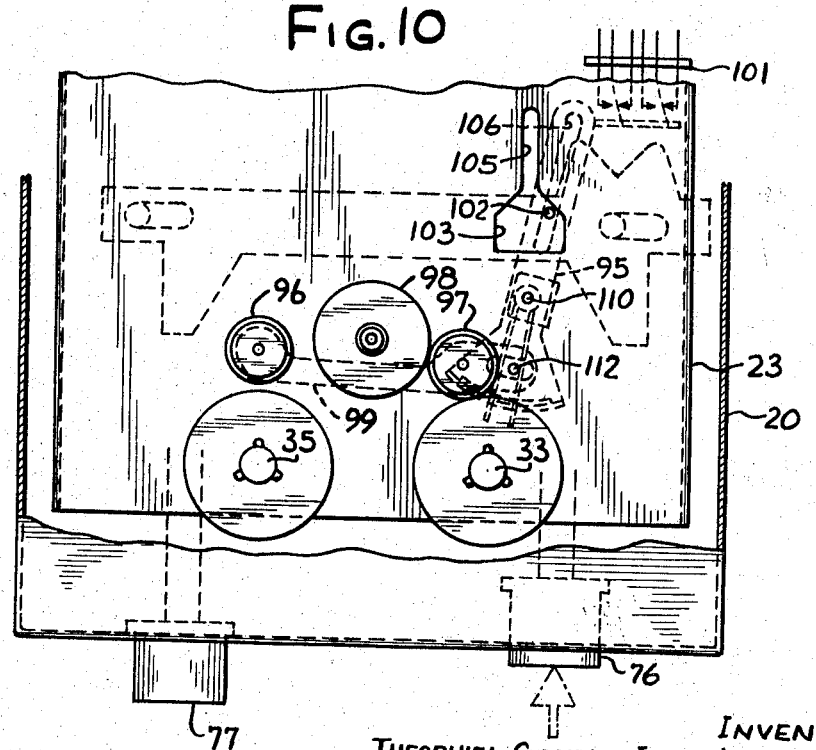

United States Patent Office 3,429,519
Patented Feb. 25, 1969

3,429,519
TAPE CARTRIDGE POSITIONING AND DRIVING APPARATUS
Theophiel Clement Jozef Lodewijk Staar, Kraainem, Belgium, assignor to Staar, S.A., Brussels, Belgium, a corporation of Belgium
Filed Oct. 12, 1966, Ser. No. 586,099
Claims priority, application Belgium, June 24, 1966, 683,077; July 6, 1966, 683,708
U.S. Cl. 242—55.13
Int. Cl. G11b 5/78; G03b 23/02
23 Claims

ABSTRACT OF THE DISCLOSURE

For use in a cartridge-loading tape transport mechanism, a cartridge positioning and driving apparatus is described in which the tape cartridge is momentarily displaced from its normal position during recording and playback for the purpose of selectively actuating fast forward and rewind functions within the drive mechanism.

---

This invention relates generally to apparatus for the recording and playback of sound from a magnetic tape in a self-contained cartridge or cassette. More particularly, the invention concerns tape recorder mechanisms which are adapted to receive a tape cartridge in engagement with a shiftable carriage which is moved with the cartridge to bring drive elements into engagement with the tape.

An important advantage of cartridge-loading tape recorders is that loading and removing the tape from the machine is greatly simplified. Magnetic tape is commonly stored on one of two reels within the cartridge, and during operation the tape is carried past a recording or playback sound head to a second reel, on which it is stored. When the tape has been transferred to the second reel during the playing of one band or track, the cartridge may commonly be released from the machine, reversed, and a second band or track of recorded material played as the tape is run back to the first reel. Certain driving elements of the tape transport mechanism must therefore enter the cartridge to provide means for controllably driving the tape past the sound head. If the commonly-used capstan and pinch roller drive system is employed, one of these elements must penetrate the cartridge to engage the tape. Tape transport and control spindles must also enter the reel hubs of the cartridge to provide tensioning for the supply reel and driving force for the takeup reel when the machine is in operation.

To receive the cartridge and accurately guide the various drive elements into engagement with the tape and reels as the cartridge is brought into position with respect to the sound head, a shiftable drive carriage carrying the drive motor, capstan and reel spindles has been successfully utilized. A tape transport incorporating such a drive carriage and associated mechanism is disclosed in my co-pending application for a Tape Deck, Ser. No. 567,115, filed July 22, 1966.

During the operation of tape decks generally, including the type described in my foregoing patent application, it is often necessary or desirable to rapidly transport the tape from one playing position to another in order to repeat certain program material or to pass over certain undesired material. For this purpose it is common to incorporate "rewind" and "fast forward" functions by which the tape may be rapidly moved in either the reverse or forward directions. This feature is preferably embodied in a mechanism allowing momentary stopping of the fast transport and playing of the tape during transport to check on the progress of the tape movement.

With conventional reel-loading tape transport, the tape is generally lifted from the sound heads by lifters or other means while the rewind or fast forward function is in operation. This is necessary in order to avoid damage to the sound heads due to the abrasive effect of the magnetic oxides used to coat the surfaces of magnetic sound tapes. If instead of using tape lifters, the sound heads are moved from the tape, another problem arises because of the difficulty with movable sound heads in maintaining perfect azimuth alignment when they are returned to the playing position. In cartridge-loading tape decks, a different problem is presented. The close tolerances and relatively narrow openings available in tape cartridges for insertion of the capstan or other drive elements makes the use of conventional tape lifters undesirable. Such lifters may also interfere with the operation of a cartridge by causing the tape to be drawn away from its natural path of movement between the reels while it is moving relatively rapidly during the rewind or fast forward functions. This gives rise to undesirable friction and wear on the lifters and on the magnetic tape itself.

In view of the foregoing, it is a principal object of the present invention to provide a tape control mechanism for tape transport which performs the useful function of transporting the tape in the rewind or fast forward modes of operation without the use of tape lifters or other friction-producing devices. Another principal objective of the invention is to provide a tape control mechanism which is momentarily engageable by the operator through simple push-button controls, after which engagement the machine returns to its normal playing or recording function without further action on the part of the operator.

In achieving the above objects, it is contemplated that the present invention will find use in cartridge-loading tape transport of the type in which a shiftable drive carriage carrying the various drive elements which engaged the cartridge and drive the tape past the sound head is employed. In tape transport of this description, the tape cartridge and drive carriage are moved in unison from a released position in which the cartridge may be inserted or removed to an operating position in which the drive elements are engaged to drive the tape past the sound head. A further object, therefore, is the provision of such a tape transport in which the drive carriage is normally resiliently urged toward the released position, but is retained during operation in the operating position in a manner allowing momentary withdrawal of the drive carriage from the sound head during rewind and fast forward operation, but which is again effective to return the drive carriage to the operating position when these functions have been completed.

A further object is to cause the rewind and fast forward functions to be effectively locked out when the drive carriage is in the released position, thereby preventing the machine from being operated incorrectly through error or mishandling by the operator. Yet another object is to provide for the selection of rewind or fast forward functions in such a machine by means of a pair of easily-identifiable push-buttons which are mutually self-locking in their operation to prevent simultaneous operation of both push-buttons at once.

Other objects and advantages of the invention will become apparent upon reading the following detailed description and upon reference to the drawings, in which:

FIG. 3 is a section taken in the plane 3—3 of FIG. 1, with the shifted position of the drive carriage being shown in phantom;

FIG. 4 is a plan view of the tape transport of FIG. 1 with the cassette and drive carriage momentarily shifted while rewinding the tape;

FIG. 5 is a plan view of the mechanism of FIG. 1 with the cassette and drive carriage shown in the released position;

FIG. 6 is a fragmentary partial section illustrating the motor and drive train which power the capstan and reel spindles;

FIG. 7 is a fragmentary partial section illustrating the push-button mechanism utilized in selecting the rewind or fast forward functions;

FIG. 8 is a fragmentary partial section similar to FIG. 7 in which the mechanism is shown as it appears during the rewind function;

FIG. 9 is a fragmentary partial section illustrating the reel spindle drive mechanism engaged for operation in the fast forward function;

FIG. 10 is a fragmentary partial section similar to FIG. 9 illustrating the same mechanism in the rewind mode of operation;

FIG. 11 is a plan view of an alternative embodiment of the present invention in which the drive carriage is suspended by rollers and ramps;

FIG. 12 is a section taken in the plane 12—12 of FIG. 11; and

FIG. 13 is a section taken in the plane 13—13 of FIG. 11.

While the invention will be described in connection with preferred and alternative embodiments, it will be understood that I do not intend to limit the invention to those embodiments, but intend to cover all alternative and equivalent constructions as may be included within the spirit and scope of the invention as defined by the appended claims.

Figure 1:
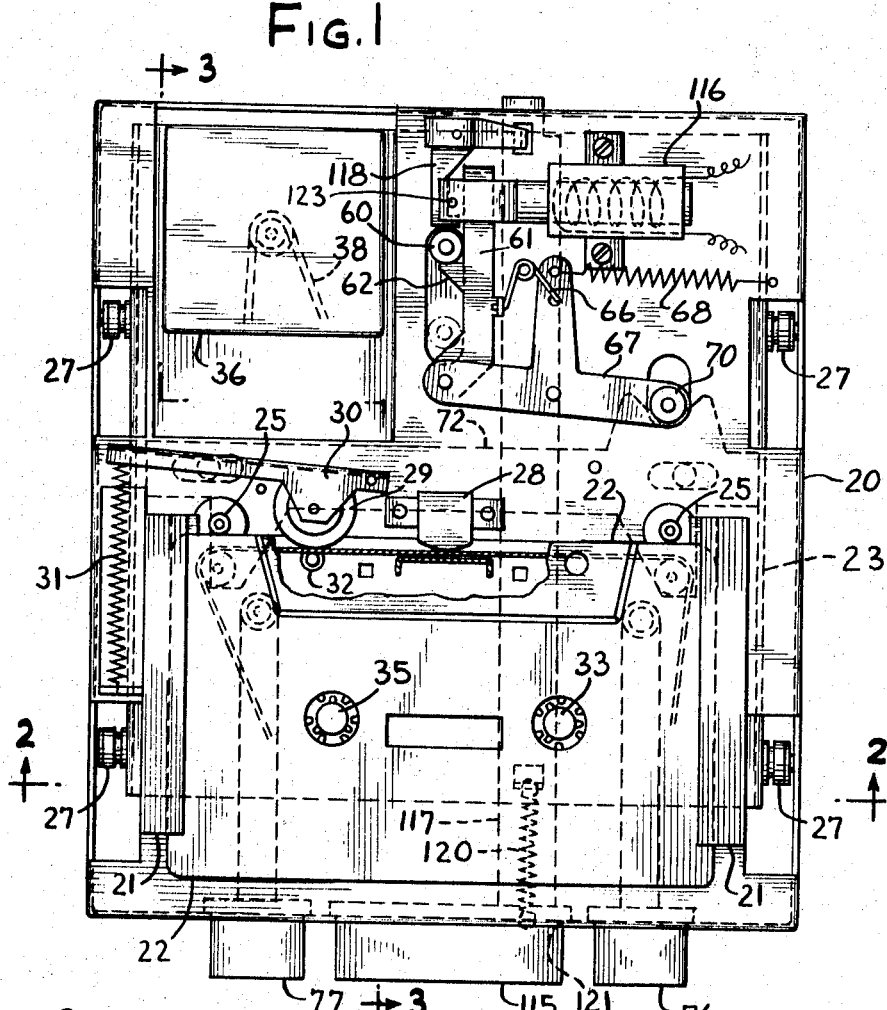
FIGURE 1 is a plan view of the tap transport mechanism of the present invention with a tape cassette shown in position for recording or playback, and with the associated electronics and exterior covers of the machine being omitted for clarity.
Figure 2:
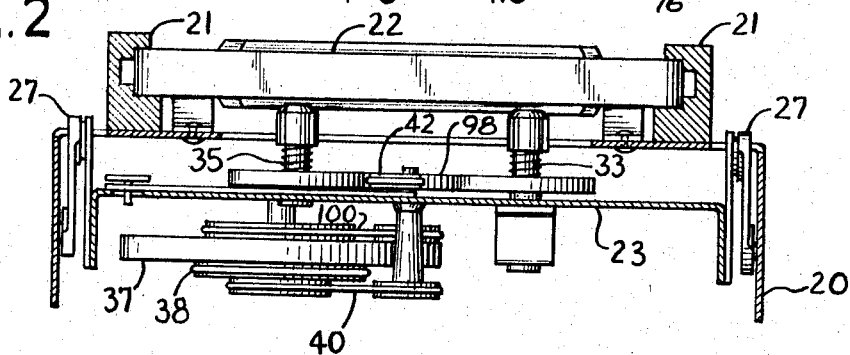
FIG. 2 is a section taken in the plane 2—2 of FIG. 1.

Turning to the drawings, there is shown in FIG. 1 a tape transport constructed according to the present invention. The principal features and method of operation of the tape transport in general will be briefly described as they relate to the present invention, but for a more detailed description the reader is referred to my co-pending application Ser. No. 567,115, previously mentioned.

The tape transport drive mechanism comprises a fixed frame or chassis 20 to which are attached guides 21 having grooves or slots into which a tape cassette 22 may be introduced by the operator. The driving elements of the tape transport are carried by a movable frame or drive carriage 23 disposed beneath the chassis 20 and movable so that the drive elements enter into penetrating engagement with the tape cassette 22 when the latter is inserted into operating position.

As the cassette 22 slides into operating position, it is guided by the guides 21 into engagement with a pair of upright lugs 25 and drives them forward in their slots in the chassis 20. The lugs 25 are hollow and contain slidable pins 26 which extend upwardly from the drive carriage 23. Each lug 25 is provided with a flange at its base to confine its movement to a path coplanar with the movement of the cassette 22 in the guides 21. When moved forward by the motion of inserting the cassette 22, the lugs 25 cause the drive carriage 23 to swing in the direction of cassette movement with a rising motion which causes the various drive elements to penetrate the respective openings of the cassette 22 and become operably engaged therewith. This motion is accomplished solely by the drive carriage 23, with the cassette 22 being restricted by the guides 21 to a direct in-and-out movement in a single lateral plane.

The drive carriage 23 is suspended from the chassis 20 by four links 27, which are pivoted at each end to form an articulated parallelogram linkage which is deformed on insertion of the cassette 22 to swing with a rising motion in the direction of cassette movement. As the cassette 22 is introduced, contact with the lugs 25 and slidable pins 26 causes the drive carriage 23 to move upward and forward with a movement coinciding exactly with that of the cassette so that if the cassette 22 is taken as a point of reference, the drive elements rise vertically into the cassette 22 with no relative lateral movement whatever.

A sound head 28 and a pinch roller 29 are carried by the chassis 20 and do not move with the drive carriage 23. The pinch roller is journalled to a pivoted arm 30 which is tensioned by a spring 31. It will be understood that while a single sound head 28 is shown in the present embodiment, a plurality of sound heads including a recording head, reproducing head and an erase head could be employed in the same manner with equal success.

Carried by the drive carriage 23 are the drive elements by which the tape is driven and controlled within the cassette 22. A capstan 32 engages the tape against the pinch roller 29 (FIG. 1) to draw the tape past the sound head 28. In addition, the supply and takeup reels within the cassette 22 are engaged by a supply reel spindle 33 and a takeup reel spindle 35 respectively which are also carried by the drive carriage 23.

A drive motor 36 is also fixed to the drive carriage 23 and shifts in unison with the other drive elements. The drive motor 36 powers both the capstan 32 and the takeup reel spindle 35, while the supply reel spindle 33 is restrained by a brake (not shown) to tension the tape slightly as it is drawn past the sound head 28. Since these elements are at all times fixed relative to one another, a simplified drive train is achieved. As shown in FIG. 6, the capstan 32 is directly secured to a flywheel 37 which is driven from the drive motor 36 by a first drive belt 38. A second drive belt 40 powers a takeup power roller 41 which, in turn, drives the takeup reel spindle 35 through a selectively interposable friction wheel 42. The friction wheel 42 is interposed in driving relationship with the takeup reel spindle 35 only when the drive carriage 23 and cassette 22 are in operating position for recording or playback. During rewind and fast forward functions, the friction wheel 42 is withdrawn by a suitable mechanism (not shown) to allow the takeup reel spindle to rotate freely.

Insertion of a tape cassette 22 by the operator causes the drive carriage 23 to simultaneously, engage and shift in unison with the cassette to an operating position (FIG. 1) in which the various tape drive elements are effective to drive the tape past the sound head 28. As the drive carriage 23 reaches the operating position at the end of its travel, it actuates a switch 59 which energizes the drive motor 36 and commences the playing of the tape.

It is a principal feature of the present invention that the drive carriage 23 is releasably retained in operating position in a manner which permits momentary shifting of the drive carriage 23 and cassette 22 to a second position (FIG. 4) in which the cassette is withdrawn from the pinch roller 29 and sound head 28 while the remaining drive elements are effective to transport the tape in the rewind or fast forward functions. This is accomplished by providing on the drive carriage 23 a latching lug 60 which is engageable with a shiftable latch 61 secured to the chassis 20. The latch 61 is provided with a shoulder 62 to retain the lug 60 during operation of the tape deck.

The latch is initially engaged and the tape deck placed in operation by insertion of a cassette 22, which causes the drive carriage 23 and latching lug 60 to shift in the direction of cassette movement until the lug 60 engages the angled reverse side of the latch shoulder 62. The latch 61 is thereby momentarily displaced, allowing the lug 60 to ride over the shoulder 62 and fall into place as illustrated in FIG. 1. The latch 61 is then resiliently snapped into latching engagement with the lug 60 by a hairpin spring 66. The latch 61 is not carried directly by the chassis 20, however, but is instead mounted on a separate shifting link 67 which is in turn pivoted to the chassis 20. The shifting link 67 is normally retained in the position shown in FIG. 1 by a latch spring 68.

The carriage return is accomplished by a pair of carriage (FIG. 3) return springs 69 which serve to resiliently urge the drive carriage toward the released position, and are prevented from doing so only by the engagement of the lug 60 with the shoulder 62 of the latch 61. In accordance with this aspect of the invention, the latch spring 68 is relatively stronger than the carriage springs 69 so that when the latch 61 is engaged, the latch spring 68 overbalances the cariage springs 69 to retain the lug 60 and thereby secure the drive carriage 23 in the position illustrated in FIG. 1 for recording and playback, wherein the capstan 32 engages the tape against the pinch roller 29 to drive it past the sound head 28. Release of the latch 61 frees the drive carriage 23 and allows it to return to the released position (FIG. 5), thereby opening the switch 59 and stopping the motor 36, urged thereto by the springs 69.

As a feature of the invention, engagement of either the rewind or fast forward functions by the operator causes the drive carriage 23 to shift slightly from the normal operating position (FIG. 1) to an intermediate position (FIG. 4) wherein the pinch roller 29 and sound head 28 are no longer engaged with the tape. In this configuration the rapid tape transport functions of rewind and fast forward operation may be accomplished easily and without excessive wear or the chance of damage. To check on the progress of the tape transport, the carriage 23 may be allowed to return momentarily to the playing position (FIG. 1) as the operator desires. In carrying out this feature whereby the tape is disengaged and re-engaged from the pinch roller and sound heads, the shifting link 67 is provided at one end with a lifting roller 70 which is engageable with a camming surface 71 on a transverse camming link 72 as shown in FIGS. 9 and 10. The camming link 72 is slidably mounted on the chassis 20 by pins 73 and corresponding elongate holes 75, which allow the link to shift laterally in either direction, whereby the lifting roller 70 is cammed upward against the force of the latch spring 68. This movement serves to shift the latch 61 slightly (FIG. 4) without disengaging the lug 60 from the latch shoulder 62, whereby the carriage springs 69 are effective to shift the drive carriage 23 and cassette 22 away from the operating position and from engagement with the pinch roller 29 and sound head 28.

Pursuant to another feature of the invention, interlocked push-buttons 76, 77 (FIGS. 7, 8) are provided to selectively effect the rewind and fast forward modes of operation. As shown in FIG. 8, actuation of the push-button 76 causes the camming link 72 to be shifted laterally in a manner resulting in lifting of the roller 70 to allow momentary shifting of the latch 61 as previously described. A roller cam 80 carried by an extension 81 of the push-button 76 engages a corresponding ramp 82 of the camming link 72 to lift the roller 70. Similarly, the push-button 77 is also provided with an extension 83 and a roller cam 85 engageable with a corresponding ramp 86 on the link 72. The push-buttons 76, 77 are provided with return springs 87, 88 which return them to their normal positions against their openings 90, 91 on the chassis 20.

It will be observed that a self-centering effect is provided the camming link 72 by the action of the lifting roller 70 in the camming surface 71. In the absence of other forces, the roller 70 seeks the bottom of the cam surface 71, which corresponds with the midpoint of travel of the camming link 72 (FIG. 7). The mechanism may then be actuated by either of the push-buttons 76, 77, at the desire of the operator.

In carrying out the invention, an interlock is provided to prevent actuation of both push-buttons 76, 77 simultaneously through the provision of flats 92, 93 adjacent the ramps 82, 86 of the camming link 72. As illustrated in FIG. 8, when one push-button 76 is actuated, bringing its respective roller cam 80 into engagement with the corresponding ramp 82, the other ramp 86 is moved slightly to one side, bringing its flat 93 opposite the roller cam 85 of the other push-button 77. Should the other push-button 77 be actuated at this time, it would encounter the flat 93 rather than the ramp 86, thereby avoiding any opposing lateral thrust on the camming link 72.

According to still another feature of the invention, actuation of the rewind and fast forward push-buttons 76, 77 is effective to cause the drive elements of the tape deck to be continuously driven in the rewind or fast forward modes of operation so long as the respective bush-buttons are held down by the operator. This is accomplished by the provision of an interposing link 95 (FIG. 6) which is effective to selectively interpose one of two intermediate rollers 96, 97 between a common drive roller 98 and the reel spindles 33, 35. The rollers 96, 97 are both carried on a common connecting link 99. The drive roller 98 is constantly driven by the flywheel 37 through a third drive belt 100. One intermediate roller 96, when interposed, is effective to drive the takeup reel spindle 35 in the forward direction at an increased speed to accomplish the fast forward function of the machine. The tape is thereby rapidly moved ahead in the normal playing or recording direction. The other roller 97, when interposed, serves to drive the supply reel spindle 33 to similarly accomplish the rapid rewind of the tape. It will be observed that the desired rotational direction of the supply reel spindle 33 for rewinding is opposite to its normal direction of rotation. For this reason, a DPDT reversing switch 101 is provided to reverse the direction of the drive motor 36 so that the rewind function may be carried out without the need for an additional idler roller in the drive train powering the supply reel for rewiding. This switch 101 is actuated by the motion of the interposing link 95 in bringing the roller 97 into engagement between the drive roller 98 and supply reel spindle 33.

The interposing link 95 by which the intermediate roller 96, 97 are selectively engaged is operated by the camming link 72 through a connecting pin 102. The connecting pin 102 is rigidly atached to the camming link 72 (FIGS. 6, 7) and engages an elongate slot 106 in the interposing link 95. It will be observed that the interposing link 95, being pivotably mounted on the shiftable drive carriage 23, will therefore shift in operation with respect to the camming link 72 which is carried by the fixed chassis 20. The elongate slot 106 is therefore provided to allow the drive carriage 23 to swing relative to the chassis 20 while maintaining coupling between the camming link 72 and the interposing 95.

In accordance with yet another aspect of the invention, engagement of the rollers 96, 97 and consequent rewind or fast forward operation is prevented by a lockout mechanism when the drive carriage 23 is not in the proper position for accomplishing these functions. Engagement of the rewind or fast forward functions will normally be done only when the drive carriage 23 is running and therefore latch in the operating position. For this reason a keyhole slot 103 is provided, having a narrow portion 105 in which the connecting pin 102 rides while the drive carriage is shifted away from its proper operating position during rewind or fast forward operation. While the connecting pin 102 is confined within the narrow portion 105 of the keyhole slot 103, inadvertent or mistaken actuation of the push-buttons 76, 77 is prevented because the connecting pin and connected camming lug 72 are locked in place against lateral movement. When the drive carriage 23 is in the operating position, however, the push-buttons 76, 77 may be individually actuated to withdraw the drive carriage momentarily because the connecting link 102 is then free to move within the wider portion of the keyhole slot 103.

In order to allow the intermediate rollers 96, 97 to seek their proper driving positions when interposed between the drive roller 98 and the reel spindles 33, 35, the rollers are pivoted on their connecting link 99 which is operably connected to the interposing link 95 by a resilient lost-motion connection. This connection comprises a hairpin spring 108 (FIG. 6) rigidly attached to the interposing link 95 by a clamp 110 and retained at its free ends by slots 111 which prevent the spring 108 from twisting out of place. The link 99 is provided with a pin 112 which rides between the legs of the hairpin spring 108 in another slot 113 in the interposing link 95. It may be seen that the link 95 is therefore free to rotate under the urging of the camming link 72 through the connecting pin 102 while the transfer rollers 96, 97 are free to find their proper driving positions relative to the drive roller 98 and reel spindles 33, 35.

As a further feature of the invention, the drive carriage 23 (FIG. 5) may be selectively released from the latch 61 by either a release push-button 115 or a solenoid 116. In either case, the latch 61 is pulled aside to free the latching lug 60 from the latch shoulder 62, allowing the drive carriage 23 to be swung out of engagement with the tape cartridge 22 by the carriage springs 69 and into the released position. Manual release of the carriage is performed by actuation of the release push-button 115 which acts through an extension 117 against a pivoted release lever 118 which contacts, at its opposite end, the latch 61. The release push-button 115 is normally urged by a return spring 120 against its opening 121 in the chassis 20. In FIG. 5, the cartridge is shown released by means of the push-button 115, and FIG. 5 also illustrates how to accomplish release of the latch 61 electrically. For this purpose, circuit means (not shown) is provided with a solenoid 116 carried by the chassis 20 and having an actuator 122 engaging the latch 61 through a pin 123. With the solenoid 116 pulled to the right, as indicated in dashed lines in FIG. 6, the pin 123 contacts the latch 61 independently of the release lever 118, so that the release lever and its associated mechanism is undisturbed by the release of the drive carriage 23 by the solenoid 116.

An alternative embodiment of the present invention is illustrated in FIGS. 11, 12 and 13. In this embodiment, the parallelogram linkage of the previous embodiment is replaced by a plurality of rollers 123 and roller ramps 126. The cassette is placed over the various drive elements of the drive carriage and retained by a spring clip 127. The drive carriage 23 in this embodiment, instead of moving upward and raising the drive elements into engagement with the tape cassette 22 while moving forward into operating position, carries the cassette and slides forward with it into operating position. The carriage 23 is shifted manually into operating position and latched by means of a latch 61 and latching lug 60 in the same manner as described in connection with the former embodiment.

As illustrated, the alternative embodiment also employs a simplified shifting mechanism in which only a single push-button 128 is utilized to momentarily withdraw the drive carriage 23 from the operating position. Such a mechanism would be useful in a simplified tape transport in which rapid tape transport in only a single direction is included for reasons of economy. As before, an interposable intermediate roller (not shown) may be used to provide the accelerated tape transport speed required for this function. For transport in the opposite direction, the carriage 23 is released, the tape cassette 22 is removed and reversed in position, and the drive carriage again is latched into operating position.

I claim as my invention:

1. In a tape transport having a drive carriage shiftable with a tape cartridge between a first operating position in which drive elements are engaged with reels of recording tape in said tape cartridge to drive said tape past a sound head, and a second operating position in which tape transport elements are effective to accomplish rapid transport of said tape, a tape cartridge control mechanism comprising, in combination, shiftable latch means including a lug on said drive carriage, said latch means being shiftable between a first latching position wherein said carriage and cartridge are retained in said first operating position and a second latching position, spring means for resiliently urging said latch into said first latching position, and shifting means for momentarily shifting said latch from said first to said second latching position.

2. A tape control mechanism according to claim 1 in which said drive carriage and cartridge are additionally shiftable to a released position in which said drive elements and reel transport elements are disengaged from said reels, said mechanism having second spring means for resiliently urging said drive carriage toward said released position, and having release means for selectively releasing said shiftable latch means, thereby freeing said drive carriage to be shifted by said second spring means from said operating positions to said released position.

3. A tape control mechanism according to claim 2 in which said second spring means is overbalanced by said first spring means whereby said drive carriage is normally retained in said first operating position by said shiftable latch means when said latch means is not shifted or released.

4. A tape control mechanism according to claim 2 in which said shifting means is manually controllable to effect rapid tape transport by shifting said drive carriage from said first to said second operating position, and in which said release means is manually controllable to release said drive carriage from said operating positions to said released position.

5. A tape control mechanism according to claim 2 in which said release means includes a solenoid operably connected to said latch means and circuit means for energizing said solenoid to effect the release of said drive carriage.

6. A tape control mechanism for use in a cartridge-loading tape transport according to claim 2, in which said drive carriage is shiftably mounted relative to said tape transport by a deformable parallelogram linkage, said mechanism having actuating means for shifting said drive carriage in parallel coordination with an inserted tape cartridge whereby said drive elements are carried by said drive carriage into penetrative engagement with said tape cartridge through the shifting of said drive carriage from said released position to said operating positions.

7. A tape control mechanism for use in a cartridge-loading tape transport according to claim 2, in which said drive carriage is adapted to carry a tape cartridge and is shiftably mounted relatively to said tape deck by a plurality of cooperating rollers and roller ramps.

8. A tape transport having a control mechanism according to claim 1 in which said drive elements comprise a supply spindle and a takeup spindle engageable with reels of recording tape, a powered drive roller, a rewind intermediate roller drivingly interposable between said drive roller and said supply spindle for driving said supply spindle in the reverse direction, a fast forward intermediate roller drivingly interposable between said drive roller and said takeup spindle for driving said takeup spindle in the fast forward direction, and roller shifting means for selectively interposing said intermediate rollers, said roller shifting means including an interposing link connected to said intermediate rollers by a resilient lost-motion coupling whereby said rollers may seek individual driving positions within a range of positions of said interposing link.

9. A tape transport having a control mechanism according to claim 1 in which said drive elements comprise a supply spindle and a takeup spindle engageable with reels of recording tape, a drive roller, a reversible motor powering said drive roller, a rewind intermediate roller drivingly interposable between said drive roller and said supply spindle for driving said supply spindle in the reverse direction, a fast forward intermediate roller drivingly interposable between said drive roller and said takeup spindle for driving said takeup spindle in the fast forward direction, roller shifting means for selectively interposing said intermediate rollers, said roller shifting means including an interposing link connected to said intermediate rollers by a resilient lost-motion coupling whereby said rollers may seek individual driving positions within a range of positions of said operating link, and switch means actuated by said interposing link for reversing said drive motor.

10. A tape transport according to claim 8 having a frame defining a first member and in which said drive carriage defines a second member shiftable relative to said first member, and having lockout means for preventing actuation of said interposing link when said carriage is not in one of said operating positions, said lockout means including a pin on one of said relatively shiftable members and a keyhole slot on the other of said members, said pin being engageable with the narrow portion of said keyhole slot when said cartridge is in said released position to restrain the operating movement of said interposing link, thereby preventing the engagement of said rewind and fast forward rollers when said carriage is in the released position.

11. A tape transport according to claim 10 having an operating link operably connected to said interposing link and push-buttons for shifting said operating link, said push-buttons being operably connected to said operating link by cams and ramps.

12. A tape transport according to claim 11 in which said ramps have flats for blocking the engagement of all of said cams except one when said one cam is in operating engagement with its corresponding ramp.

13. A tape transport for receiving tape cartridges including a drive carriage shiftable with a tape cartridge between a released position, an intermediate position in which tape transport elements are operative to accomplish rapid intra-reel transport of the tape in said cartridge, and an operating position in which tape drive elements are operative to drive the tape in said cartridge past a sound head, spring means connected to resiliently urge said drive carriage and cartridge from their operating position toward said intermediate and released positions and adapted to be manually overcome in shifting to their operating position, shiftable latch means having first and second latching positions for retaining said carriage and cartridge in their operating and intermediate positions, respectively, resilient means connected to said latch means and normally effective to overbalance said spring means and hold said latch means to its first latching position thereby retaining said carriage and cartridge in their operating position, and shifting means for momentarily shifting said latch means to its second latching position or for releasing said latch means thereby allowing said spring means to shift said carriage and cartridge to their intermediate or released positions.

14. A tape transport deck for receiving tape cartridges including a drive carriage shiftable with a tape cartridge between a released position and an operating position in which a capstan drive is engaged to drive the tape in said cartridge past a sound head, and manually operable means for shifting said drive carriage and cartridge to an intermediate position in which said capstan drive is disengaged and a reel drive is operative to accomplish rapid intra-reel transport of the tape, said capstan drive including a pinch roller and a powered capstan carried by said shiftable carriage so as to become disengaged from pinching the tape against said roller as an incident to movement of said carriage to the intermediate position, said reel drive including spindles engaged with the takeup and supply reels, and forward and reverse drive elements engageable to drive said takeup and supply reels, respectively, via said spindles, and manually operable means connected to engage said forward and reverse reel drive elements while simultaneously shifting said carriage from the operating to the intermediate position.

15. A tape transport according to claim 14 including means for driving said takeup spindle in the forward direction during recording or playback with the carriage and cartridge in the operating position.

16. A tape transport according to claim 14 having supply and takeup spindles carried by the drive carriage and engaged with tape cartridge supply and takeup reels in the operating and intermediate positions of the drive carriage and cartridge, and in which said reel drive includes rewind and fast forward rollers shiftable responsive to actuation of said manually operable means into drive relation with said supply and takeup spindles, respectively.

17. A tape transport according to claim 14 adapted to receive a tape cartridge having two reels with the tape being transportable from one reel to the other, said drive carriage carrying supply and takeup spindles engaged in said reels with the carriage and cartridge in their operating and intermediate positions in the tape transport, said reel drive including rewind and fast forward drive elements selectively shiftable responsive to actuation of said manually operable means into drive relation with said supply and takeup spindles for fast transport of the tape from either reel to the other, said manually operable means including forward and rewind push-buttons, and said tape transport further including a push-button interlock including means movable upon actuation of one of said forward and rewind push-buttons into position to lock the other against actuation.

18. A tape transport for receiving tape cartridges including a drive carriage shiftable with a tape cartridge between a released position and an operating position in which a capstan drive is engaged to drive the tape in said cartridge past a sound head, said drive carriage and cartridge also having an intermediate position in which said capstan drive is disengaged and a reel drive is operative to accomplish rapid intra-reel transport of the tape, said capstan drive including a pinch roller and a powered capstan carried by said shiftable carriage so as to become disengaged from pinching the tape against said roller as an incident to movement of said carriage to the intermediate position, said reel drive including spindles engaged with the takeup and supply reels in both the operating and intermediate positions of the carriage, a latching element for retaining the carriage in its operating position, means mounting said latching element for longitudinal and pivotal movement, said latching element being pivotally movable into and out of latching relation to hold or release the carriage and being longitudinally movable to also hold the carriage in its intermediate position, and manually actuated means for selectively longitudinally moving said latching element or pivotally moving said element out of latching relation with the carriage.

19. A tape transport according to claim 18 including resilient means urging said latching elements longitudinally to hold the carriage in its operating position, said manually actuated means being operable to overcome said resilient means in shifting said carriage to the intermediate position.

20. A tape transport according to claim 18 in which the pivot around which the latching element pivots is provided by a member which is movable to shift the pivot into two end positions, one of which retains the drive carriage in the operating position, while the other retains the drive carriage in the intermediate position.

21. A tape transport according to claim 20 including resilient means urging said latching element to the first of the positions of said latching element supporting member, a stop engaged by said member and defining said first position, and a carriage return spring tending to shift said drive carriage from the operating to the intermediate and released positions, said resilient means being effective to overbalance said return spring with the latching element in latching relation to the carriage.

22. A tape transport according to claim 21 including a fixed frame, a pivotal lever carried by said frame to support said latching element, a control element for actuating said pivotal lever and a push-button mounted on said frame and connected to operate said control element.

23. A tape transport according to claim 13, said drive elements including a pair of spindles adapted to be engaged in reels in the tape cartridge with the latter in its intermediate position, and manually operable means for actuating said shifting means to shift said latch means and the carriage to its intermediate position and for simultaneously engaging said forward or rewind drive to rotate one of said reel spindles for intra-reel transport of the tape.

References Cited

UNITED STATES PATENTS

| | | |
|---|---|---|
| 3,080,101 | 3/1963 | Kreithen et al. _____ 226—174 |
| 3,273,815 | 9/1966 | Schüller _____ 242—55.13 |

FOREIGN PATENTS

| | | |
|---|---|---|
| 1,422,937 | 11/1965 | France. |
| 800,638 | 8/1958 | Great Britain. |

LEONARD D. CHRISTIAN, *Primary Examiner.*

U.S. Cl. X.R.

274—4; 352—78